No. 882,718. PATENTED MAR. 24, 1908.
J. SLEE.
ROAD VEHICLE WHEEL.
APPLICATION FILED OCT. 23, 1906.

2 SHEETS—SHEET 1.

Witnesses

Inventor
John Slee
By
Mason Fenwick & Lawrence
Attorneys

No. 882,718. PATENTED MAR. 24, 1908.
J. SLEE.
ROAD VEHICLE WHEEL.
APPLICATION FILED OCT. 23, 1906.

2 SHEETS—SHEET 2.

Witnesses
Elizabeth P. Crump

Inventor
John Slee,
By Mason Fenwick & Lawrence
Attorneys.

UNITED STATES PATENT OFFICE.

JOHN SLEE, OF NEWTON-LE-WILLOWS, ENGLAND.

ROAD-VEHICLE WHEEL.

No. 882,718.

Specification of Letters Patent.

Patented March 24, 1908.

Application filed October 23, 1906. Serial No. 340,164.

*To all whom it may concern:*

Be it known that I, JOHN SLEE, a subject of the King of Great Britain, residing at Newton-le-Willows, in the county of Lancaster, in the Kingdom of England, engineer, have invented certain new and useful Improvements in Road-Vehicle Wheels, for which application has been made in Great Britain, No. 19,224, dated August 28, 1906; No. 14,328, dated June 22, 1906; No. 12,330, dated May 26, 1906.

This invention has for its object to provide a resilient tire for road vehicle wheels which will avoid the disadvantages of air inflated tires, which are so liable to puncture.

The invention is adapted especially for use on the wheels of self-propelled vehicles, such as motor cars, motor omnibuses or the like, and its object is to provide an improved arrangement by which the necessary resiliency is obtained with a minimum of cost.

Figure 1:
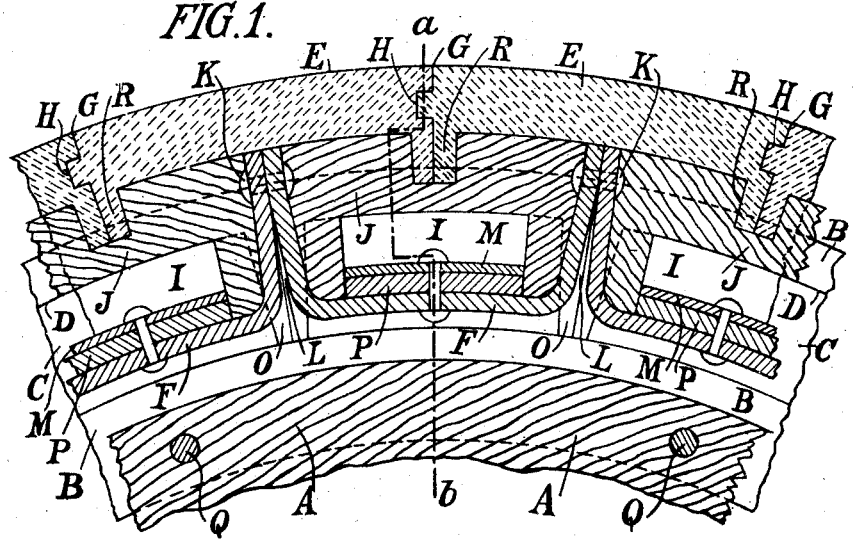
Figure 2:
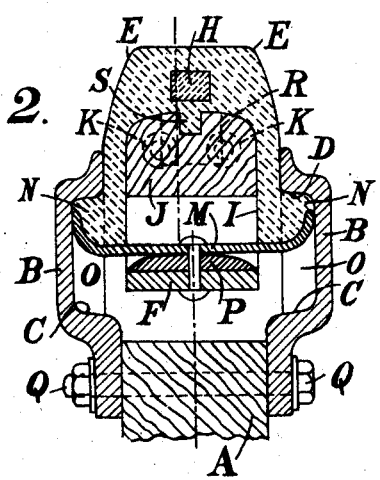
Figure 3:
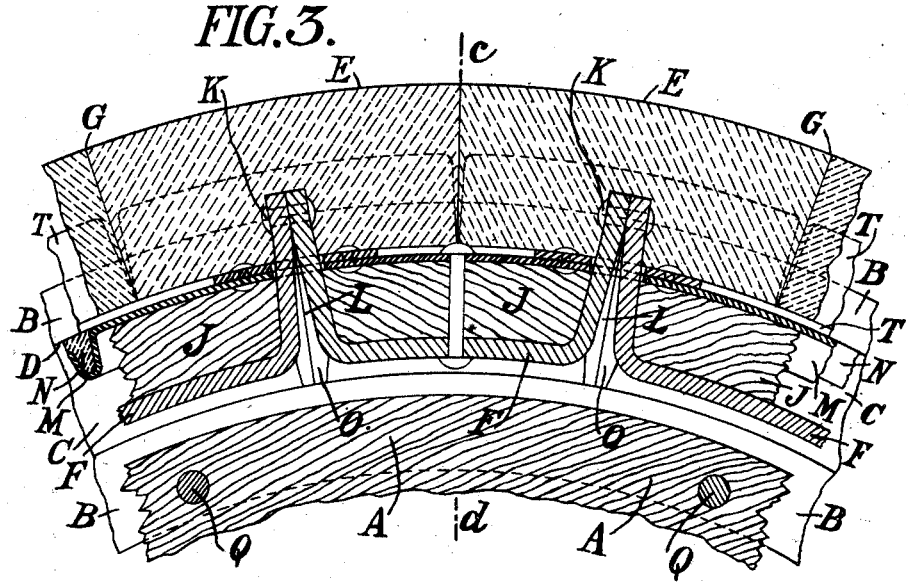
Figure 4:
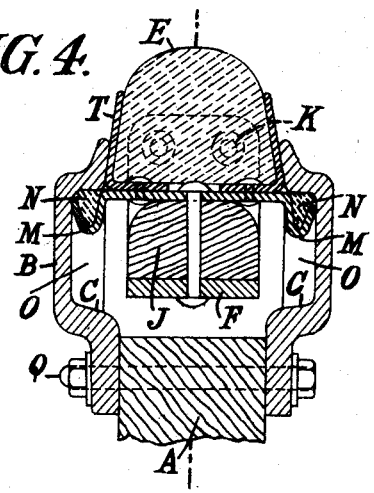

In the accompanying drawings—Figure 1 is a longitudinal section through a portion of my tire; Fig. 2 a cross section on line *a b*. Fig. 3 is a longitudinal section through a portion of my tire adapted for heavier vehicles; Fig. 4 a cross section on the line *c d*.

In carrying the invention into effect, A is the felly of the wheel to which I bolt rings B at each side. These rings have an annular groove C in them with an abutment D. The tire is made in segments E of hard rubber, gutta percha or other compressible material with side flanges N at the base, and each segment E is attached to cradles or shoes F, the end walls of which are riveted together and form a complete ring with the segments of rubber abutting against each other at G. The flanges N fit in the grooves C in the side rings B. The abutting ends G of the segments E and the abutting ends of the shoes or cradles F are arranged to alternate with each other, that is to say the abutting ends of the segments E are about midway in the length of each shoe F, and are coupled together for the purpose of keeping them true by a projection or tongue H at the end of each segment E, entering a cavity or socket in the end of the adjacent one. The segments are lightened by having hollow cavities I formed in them, and these cavities filled with wood or other suitable material J. The abutting ends of the segments are flanged at R and the flanges engage transverse depressions in the wood fillings J, and S is a circumferential flange on the inside periphery of the segments which engages a corresponding depression in the fillings J. The abutting ends of the shoes F are riveted together at one part K, leaving a small space between the abutting ends at another part L, in such a manner as to enable the shoes to close up the said space L when the weight of the load is applied, and form a complete ring capable of a certain amount of resilience. This space L can if desired be filled with rubber to form a cushion. When the tire is in use and pressure applied, the cavities L close up, and at the same time the rubber segments E are compressed together circumferentially.

The segments E are strengthened at the joint by saddle pieces M, which are let into the rubber E and are fastened thereto. These rest on the shoes F and form a foundation for the segments E at each joint. The saddles M bear at the sides against the annular grooves in the retaining rings B, and grip, together with the base flanges N of the segments, against the abutments D of the side rings B. To avoid creeping of the tire round the wheel I provide at intervals on the retaining rings, that are fastened to the wheel, V-shaped projections O which enter corresponding depressions in the base flanges N of the segments E so as to interlock therewith. These projections O are located in the annular grooves C in the rings B.

P are blocks of wood or metal inserted between the saddle pieces M at mid width and the cradles F. These blocks are rounded off on top towards each side, and act as supporting stirrups for the saddle pieces M which support the side flanges of the rubber segments, and receive the whole load brought to bear upon the rubber. The saddle pieces M also prevent the rubber segments spreading laterally, that is they bind the rubber segments transversely. The saddle pieces M are thus springy at each side of the block P, and engage the annular grooves in the side rings B. Thus I get a circumferential resilience by means of the spaces L between the shoes, and side resilience (also circumferential) by means of the saddle pieces M.

The mode of action is as follows:—The shoes F are assembled and riveted together to form the tire, and the rubber segments E are put into position under compression. The two annular rings B are now put on, one on each side of the tire, so that the base flanges N of the segments, will engage against the abutments D in the rings, and the rings are bolted to the felly A by means of the bolts Q. As the wheel turns round it is possible for the tire to recede a little into the space between the side rings B and thus absorb vibration, and vibration is also absorbed by the spaces L between the abutting ends of the shoes, and by the resilience of the saddle pieces M. The drive from the wheel to the tire is communicated through the contact or grip between the flanges N and the grooves C and the interlocking projections O.

To prevent the rubber segments E swelling at the sides they can be incased or embedded in pockets or separate shoes T which are riveted to the saddles M aforesaid, as shown in Figs. 3 and 4. The rubber side flanges N are in this case made separate from the segments E and fill the hollows of the U shaped flanges of the saddle M and abut end to end to form a continuous ring. J are wood blocks inserted between the saddles M and the base of the cradles F.

Similar letters of reference in Figs. 1 and 2 and Figs. 3 and 4 refer to like parts. A tire made in this form (Figs 3 and 4) is suitable for heavier vehicles.

I declare that what I claim is:—

1. The combination of a wheel, a tire extending around the rim of the wheel and comprising a series of cradles abutting against each other and designed to yield circumferentially, and a sectional tread carried by the cradles, the abutting ends of the tread sections and the cradles alternating with each other.

2. The combination of a wheel, flanges projecting outwardly from the periphery of the wheel, a series of cradles arranged between the flanges, a tread carried by the cradles, and saddle pieces carried by the cradles and coöperating with the before mentioned flanges to limit the movement of the cradles.

3. The combination of a wheel, flanges projecting outwardly from the rim of the wheel and formed with annular grooves, a series of cradles disposed between the flanges and designed to yield circumferentially, and a tread carried by the cradles and provided with side flanges fitting within the before mentioned grooves in the flanges projecting from the rim.

4. The combination of a wheel, flanges projecting outwardly from the rim of the wheel, said flanges being formed with annular grooves, a series of cradles disposed between the flanges and designed to yield circumferentially, saddles carried by the cradles and engaging the grooves in the before mentioned flanges, and a tread portion carried by the saddles, the said tread portion being formed with side flanges fitting within the annular grooves in the flanges projecting from the rim of the wheel.

In witness whereof, I have hereunto signed my name this 27th day of September 1906, in the presence of two subscribing witnesses.

JOHN SLEE.

Witnesses:
 G. C. DYMOND,
 H. COULSON.